Aug. 19, 1958   C. BARTELL ET AL   2,848,105
IMPROVED NORMALLY TACKY AND PRESSURE-SENSITIVE ADHESIVE TAPE
Filed July 15, 1957
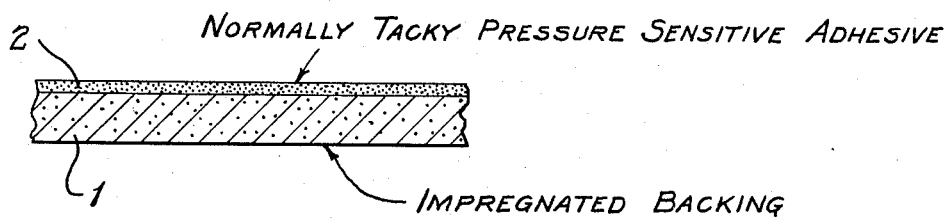
2 — NORMALLY TACKY PRESSURE SENSITIVE ADHESIVE
1 — IMPREGNATED BACKING
INVENTOR.
CHARLES BARTELL
JOSEPH R. WESCHLER
BY
ATTORNEY

United States Patent Office 2,848,105
Patented Aug. 19, 1958

2,848,105

IMPROVED NORMALLY TACKY AND PRESSURE-SENSITIVE ADHESIVE TAPE

Charles Bartell, Arlington, Mass., and Joseph R. Weschler, New Brunswick, N. J., assignors to Permacel-Le Page's Inc., a corporation of New Jersey Application July 15, 1957, Serial No. 671,886

23 Claims. (Cl. 206—59)

This invention relates to a normally tacky and pressure-sensitive adhesive sheet material and, more particularly, to a normally tacky and pressure-sensitive adhesive tape formed with a unified paper backing.

Paper-backed, normally tacky and pressure-sensitive adhesive tapes, particularly those used for masking purposes, should have a combination of satisfactory elongation, flexibility, edge tear, wet and dry tensile strength and delamination resistance. By delamination resistance is meant the resistance offered by the backing to being split into two layers by forces perpendicular to the sheet. By edge tear is meant the resistance to starting a tear at the edge of a tape as one might encounter in masking sharply curved surfaces. Flexibility, wet tensile strength and elongation have the conventional meanings associated with them. In the case of masking tapes, the product must have good elongation, flexibility and edge tear in order that the tape be curved to mask curved lines without tearing during application.

Paper backings for use in pressure-sensitive tapes can be unified or strengthened internally by treatment of the paper with aqueous latices of elastomeric polymers. The sheets are impregnated in amount sufficient to deposit substantial rubbery polymer solids in the web to bond the fibers thereof to a degree sufficient to lend the tape high internal strength. In the treatment of paper webs with latices, however, it has been generally found that the edge tear, elongation and flexibility of the sheet suffered considerably whenever ingredients were incorporated in the latex for the purpose of improving the tensile strength and delamination resistance of the product. Obviously, a balancing of the characteristics of the tape is necessary to obtain a successful commercial product and increasing one property to the severe detriment of others is not advantageous.

Accordingly, it is an object of this invention to provide a unified paper web suitable for use as a backing element for a normally tacky and pressure-sensitive adhesive sheet wherein the backing has the characteristics of improved delamination resistance and tensile strength (wet and dry) and yet adequate flexibility, elongation and edge tear.

It is an additional object of this invention to provide a masking tape having the aforementioned properties.

It is a further and more specific object of this invention to provide an impregnant composition for saturating paper webs to form backing elements with balanced properties of edge tear, flexibility, elongation, tensile strength and delamination resistance.

It is a further object of this invention to provide a novel method for producing unified paper webs and masking tape having the aforementioned characteristics.

These and other objects of the invention will become apparent when consideration is given to the hereinafter detailed description of this invention.

In accordance with this invention, an open porous saturable paper web is treated with an aqueous dispersion including an elastomeric conjugated diene copolymer containing an acid group and a minor amount of a water-dispersible heat-advancing resin selected from the group consisting of water-dispersible phenol-formaldehyde resins, urea-formaldehyde resins and melamine-formaldehyde resins. The term "water-dispersible" as applied to the heat-advancing resin in the specification and claims means those resins which exist either as a solution or as a colloidal suspension in aqueous medium. More particularly, the elastomeric copolymers used in accordance with this invention are copolymers formed by copolymerizing a conjugated diene and at least one different copolymerizable monomer, at least one of said different monomers containing a carboxylic group.

In general, the heat-advancing resin is in an amount from 0.5 to 25% by weight of impregnant solid. Preferably, the heat-advancing resin is in an amount from about 0.5 to 7% by weight, for it has been found that at such concentrations excellent over-all characteristics of good delamination resistance, wet and dry tensile strength, elongation, flexibility and edge tear are obtained. Higher resin contents than 7% result in unified paper having still higher delamination resistance and wet strength, but somewhat lower edge tear and flexibility.

Tapes formed with paper backings unified in accordance with this invention, i. e. impregnated in the above manner and thereafter cured, have been found to perform excellently under humid and wet conditions. To test their resistance to high humidity, tapes made from backings in accordance with this invention were compared with backings impregnated with the same latex composition except that no heat-advancing resin was employed and also with backings impregnated with a latex including butadiene-styrene copolymer and a heat-advancing resin. These tapes were all aged three days at 150° F. and 100% relative humidity. Upon rapid unwinding, all tapes delaminated except the one using the backing of this invention.

Moreover, not only are the unified papers of this invention more resistant to delamination under wet and humid conditions but also under dry conditions. To test this property, tapes made with the backings of this invention were compared to tapes made with conventional butadiene-styrene impregnated backings, one with and one without a heat-advancing resin cure, by aging them six days at 150° F. and 35% relative humidity (NAA—Navy Accelerated Aging Test). Upon rapidly unwinding them on a machine, where adhesions to backing can be measured, it was found that the backings made in accordance with the invention could withstand adhesions to backing of very high values without delaminating, whereas the backing not formed in accordance with this invention tended to delaminate at relatively low values. Accordingly, tapes made in accordance with this invention are practically delamination free and have a high safety factor. This important property may also be illustrated with a masked car that has been painted and baked. Baking usually has the effect of causing the tape to adhere very strongly to the metal surface. Upon stripping off the tape, it has been found that heretofore used backings often delaminate, leaving a deposit on the metal, and thus mar the paint job, whereas the backings of this invention do not.

Various types of fibrous webs may be employed as the sheet material of this invention, so long as the web is porous and can be completely saturated. The web may be made in part or in whole from wood, rope or rag fibers or other fibrous material, natural or synthetic. Preferably, paper webs of the conventional type employed as backings for normally tacky and pressure-sensitive adhesive tapes, such as those formed of kraft pulp and the like, are used. The paper may be flat or it may be creped, crimped, embossed or otherwise treated so as to provide rugosities or corrugations whereby stretchability of the sheet is increased.

As indicated heretofore, the elastomeric copolymer suitable for use in this invention is a conjugated diene copolymer containing an acid group and particularly a carboxylic group. The preferred diene in forming the copolymer is butadiene although other dienes may be used such, for example, as alkyl substituted dienes like isoprene (methyl butadiene). As indicated heretofore, the diene is copolymerized with at least one different copolymerizable monomer, at least one of which different monomers contains a carboxylic group (—COOH). Examples of suitable monomers containing the desired carboxylic group are aliphatic unsaturated monocarboxylic acids such, for example, as the acrylic acids as exemplified by acrylic acid, alpha-methacrylic, alpha-ethacrylic acid and chloroacrylic acid; and unsaturated aliphatic polycarboxylic acids, anhydrides and partial esters such, for example, as crotonic acid, itaconic acid, maleic acid, fumaric acid, aconitic acid and chloromaleic acid.

Examples of suitable copolymers which may be used in accordance with this invention are those formed by the copolymerization of butadiene and a monomer containing a carboxylic group such, for example, as butadiene-ethacrylic acid copolymer and butadiene-methacrylic acid copolymer. The copolymer may be in the form of a terpolymer formed from three monomers such, for example, as butadiene-styrene-ethacrylic acid copolymer, and butadiene-styrene-methacrylic acid copolymer. The diene, used in forming the copolymer, should be in an amount at least 40% by weight of the total copolymer, and preferably at least 50%, and the acid containing monomer should be in an amount from 1 to 35% by weight of the total copolymer, and preferably less than 20%.

As heretofore indicated the phenolic-aldehyde resin added to the impregnant in the described minor amounts must be reactive when heated or catalyst activated, must be water-soluble or at least readily dispersible in water at a neutral pH or above, and must be stable when admixed with the latices to form the impregnant. Exemplary of such reactive phenolic resins are those formed by the alkaline condensation of formaldehyde and phenol in a ratio of from about 1.1 to about 3 mols of formaldehyde per mol of phenol and the reaction arrested while the resin is still in the heat-advancing stage. Substituted phenols such as resorcinol or cresol may be employed, and other aldehydes than formaldehyde such as furfuraldehyde may be used. The pH of such resins usually range from 7 to 11. Examples of such phenolic resins are the "Durez" resins such, for example, as "Durez 14798" (62% solids) manufactured by Durez Chemical Co., a subsidiary of Hooker Chemical Company. Additional examples of suitable water-dispersible resins are those disclosed in U. S. Patent 2,457,493. The resins may be heat-curing in themselves or may require a conventional catalyst to increase the rate of or complete their cure. Phenolic resins which require treatment or the presence of another ingredient to render them heat-reactive, such as the Novalac type resins may be employed, so long as there results in the impregnant a resin which is rendered water-soluble or dispersible and heat-reactive, which may be due to additional formaldehyde derived from an additive such as hexamethylene diamine. It is to be appreciated that such resins are included within the scope of the term heat-reactive phenolic-aldehyde resin as used herein.

Preferred resins of urea-formaldehyde type useful in accordance with this invention are those made by reacting from 1.5 to about 2 moles of formaldehyde per mole of urea. Specific examples of these well known urea-formaldehyde resins are the "Rhonite" urea-formaldehyde resins manufactured by Rohm & Haas such, for example, as "Rhonite-R-2" (85% solids). Additional examples of suitable urea-formaldehyde resins which may be used in accordance with this invention are those water-soluble or water-dispersible resins disclosed in U. S. Patents 2,407,376 and 2,407,599. The urea-formaldehyde resins useful in accordance with this invention are usually neutral or alkaline and cure fastest under acid conditions.

Examples of suitable melamine-formaldehyde resins which may be used in accordance with this invention are those water-soluble or water-dispersible resins disclosed in U. S. Patent 2,291,079. Preferred resins of this type are those made by reacting from about 2 to 6 moles of formaldehyde per mole of melamine. These resins cure most rapidly under high heat and acid conditions. Specific examples of these well-known melamine-formaldehyde resins are the "Aerotex" melamine-formaldehyde resins such, for example, as "Aerotex M-3" (80% solids), manufactured by American Cyanamid.

In accordance with this invention, the fibrous web is impregnated with the latex in amount sufficient to enable incorporation of the dry solids of the impregnant into the sheet in amount approximately 25% to about 200% of the dry non-impregnated sheet. After impregnation, the saturated webs are preferably heated to cure the resin to obtain at least partial polymerization thereof. Relatively long curing times at low temperatures or short times at higher temperatures may be employed. It is possible to employ the wet tensile strength as an indication of cure; and, hence, in accordance with this invention the degree of cure considered desirable is at least a 25% increase in the backing after cure, as compared to before cure. Preferably, the backings are cured from 10 to 600 seconds at a temperature of 300° F. to 400° F. Such curing will normally result in an increase in wet tensile strength of the sheet to several hundred times that of its original value and occasionally as much as 1000%.

The following are examples of impregnated backings for adhesive sheets and tapes, including control samples of the prior art and samples formed in accordance with the present invention. It will be appreciated that the materials and proportions listed are exemplary, and the invention is not to be construed as limited thereto. In the examples, unless otherwise indicated, all parts and percentages are by weight. Also, in the examples, the phenol-formaldehyde resin used in all instances was "Durez 14798"; the urea-formaldehyde resin was "Rhonite-R-2"; and the melamine-formaldehyde was "Aerotex-M-3."

EXAMPLE I

To compare backing formed in accordance with this invention (Sample D) (that is, including an impregnant comprising a conjugated diene copolymer containing a carboxylic radical and a minor amount of a phenolic resin) with samples A–C formed with impregnants excluding said copolymer and/or phenolic resin, the following samples were prepared.

*Sample A*

A 30-pound creped saturating paper was saturated with an equal dry weight of butadiene-styrene latex (50% butadiene-50% styrene, and a Mooney of 75) and one part of an antioxidant, hydroquinone monobenzyl ether, which will be used throughout these examples. The impregnation was accomplished with conventional squeeze roll equipment, and the wet sheet dried and cured one minute at 370° F. in a festoon type of air circulating oven.

*Sample B*

A 30-pound creped saturating paper was saturated with an equal dry weight of a latex composition consisting of 94% of a butadiene-styrene latex (Sample A) and 6% phenol-formaldehyde resin. The impregnated paper was cured for one minute at 370° in an air circulating oven.

*Sample C*

A 30-pound creped saturating paper was saturated with an equal dry weight of an acid-GR–S type of latex (18.9% styrene, 72.8% butadiene and 8.3% ethacrylic acid, Mooney of 50) and cured one minute at 370° F. in an air circulating oven.

*Sample D*

A 30-pound creped saturating paper was saturated with an equal weight of a latex composition consisting of 94% acid-GR–S type latex (see Sample C) and 6% of phenol-formaldehyde resin. The backing was cured one minute at 370° F.

The tests result obtained from the above samples are shown in following Table I:

TABLE I

| Sample No. | Latex Type | Percent Phenolic Resin | Delam., Oz./In. | Wet Ten., lbs./In. | Edge Tear, Pounds |
|---|---|---|---|---|---|
| Sample A | GR–S | 0 | 50 | 2.9 | 4.1 |
| Sample B | GR–S | 6 | 50 | 14.2 | 3.5 |
| Sample C | Acid-GR–S | 0 | 52 | 2.0 | 3.5 |
| Sample D | Acid-GR–S | 6 | 70 | 16.2 | 3.3 |

From the above Table I, it will be observed that Sample A impregnated with a butadiene-styrene (GR–S) latex and no phenolic resin is poor in delamination resistance and wet tensile although it has adequate edge tear. Sample B impregnated with the same copolymer as Sample A but containing 6% phenolic resin shows an improvement in wet tensile over Sample A but its delamination resistance is relatively poor and an inferior backing results. Sample C impregnated with a butadiene-styrene-ethacrylic acid latex and no phenolic resin is similar to Sample A in that it is poor in delamination resistance and wet tensile although it has adequate edge tear. Sample D impregnated with a butadiene-styrene-ethacrylic acid latex and containing 6% phenolic resin in accordance with the present invention has excellent over-all characteristics with respect to delamination resistance, wet tensile and edge tear.

EXAMPLE II

To illustrate the effect of adding different amounts of phenolic resin to a conjugated diene copolymer containing a carboxy group in accordance with the present invention, the following samples were prepared:

*Sample E*

A 30-pound creped saturating paper was saturated with 90% of its weight (dry basis) of a butadiene-styrene-ethacrylic acid copolymer (72.8; 18.9; 8.3). The sheet was dried in an air-circulating oven.

*Sample F*

A 30-pound sheet was saturated with 90% of its weight of a latex composition containing 98.5% of an acid latex used in Sample E, 1.0% phenolic resin and 0.5% of an antioxidant. The sheet was cured for one minute at 370° F.

*Sample G*

Same as Sample F except the impregnant was 97.5% acid latex, 2% phenolic resin and 0.5% antioxidant.

*Sample H*

Same as Sample F except the impregnant was 93.5% acid latex, 6% phenolic resin and 0.5% antioxidant.

When Samples E–H were tested the following results were obtained summarized in following Table II:

TABLE II

| Sample No. | Percent Phenolic Resin | Wet Ten., lbs./in. | Delamination, Ounces/In. | Edge Tear, Pounds |
|---|---|---|---|---|
| E | 0 | 1.8 | 52 | 3.5 |
| F | 1.0 | 8.3 | 64 | 3.6 |
| G | 2.0 | 11.6 | 64 | 3.6 |
| H | 6.0 | 16.2 | 70 | 3.3 |

From the above Table II, it will be observed that Sample E (control) is relatively low in delamination resistance and wet tensile while possessing a satisfactory edge tear. The remaining Samples F–H, formed in accordance with this invention showed increased dry delamination and wet tensiles without significant reduction of edge tear, softness and flexibility.

EXAMPLE III

To compare the effect of varying the concentration of carboxylic groups in the latex mix the following samples were prepared:

*Sample I*

A 4-mil rope paper was saturated with 80% of its weight with GR–S type latex (50% butadiene–50% styrene, Mooney 50) and dried in a circulating oven.

*Sample J*

A 4-mil rope paper was saturated with 80% of its dry weight with a latex composition containing 95% of an acid-GR–S type latex (50% butadiene–49% styrene and 1% ethacrylic acid, Mooney 50) and 5% of a phenolic. The sheet was cured 30 seconds at 385° F.

*Sample K*

Same as Sample J except that the acid-GR–S composition is 50% butadiene–45% styrene and 5% ethacrylic acid, Mooney 75.

*Sample L*

Same as Sample J except that latex composition is 70% butadiene–30% methacrylic acid, Mooney 140.

Test results on the above samples are given in below Table III:

TABLE III

| Sample No. | Percent Acrylic Acid | Delamination, Ounces/Inch |
|---|---|---|
| I | 0 | 42 |
| J | 1 | 55 |
| K | 5 | 64 |
| L | 30 | 76 |

From above Table III, it will be observed that Sample I in which the latex impregnant contains no carboxylic groups has a low delamination resistance. Sample J contains 1.0% by weight of ethacrylic acid, and a higher delamination resistance results. Sample K containing 5% ethacrylic acid shows an even higher delamination resistance than Sample J, while Sample L containing 30% methacrylic acid shows an even higher delamination resistance.

EXAMPLE IV

The following samples were prepared to illustrate the use of additional conjugated diene copolymers containing carboxylic groups and curing resins in accordance with the present invention.

*Sample M*

A 30-pound flat kraft paper was saturated with an equal weight of a latex (10% methacrylic acid, 90% butadiene, Mooney 75) and dried in an air-circulating oven.

Sample N

Same as Sample M except that the composition consisted of 94.5% of the latex, 5% of a phenolic resin and 0.5% antioxidant. The sheet was cured 30 seconds at 385° F.

Sample O

Same as Sample N except that urea formaldehyde was used instead of phenol formaldehyde.

Sample P

Same as Sample N except that melamine formaldehyde was used instead of phenol formaldehyde.

Test results on the above samples are summarized in Table IV:

TABLE IV

| Sample No. | Resin Type | Wet Tensile, Pounds/Inch | Delamination, Ounces/Inch |
| --- | --- | --- | --- |
| M | None | 3 | 48 |
| N | Phenolic | 15 | 65 |
| O | Urea | 12 | 55 |
| P | Melamine | 13 | 58 |

From the above Table IV it is seen that Sample M containing butadiene-methacrylic acid copolymer (90:10) and no curing resin has a low tensile and low delamination resistance, Samples N, O and P impregnated with the same copolymer as in Sample M but containing 5% phenolic, urea and melamine formaldehyde resins, respectively, all show increase in wet tensile and delamination resistances over Sample M.

EXAMPLE V

Additional samples Q, S and U of backing prepared in accordance with the present invention are now given below. Prior art samples R and T are given for comparison.

Sample Q

As an example of low percent impregnation, a 30-pound creped paper was impregnated with only 40% of its weight of a latex composition used in Sample D and cured 1 minute at 385° F. This sheet had a delamination value of 50 ounces/inch and a wet tensile of 15 pounds/inch. A sheet impregnated with a normal GR-S would have only 25 ounces/inch delamination resistance and only 2 pounds/inch wet tensile.

Sample R

A 30-pound creped kraft paper was saturated with 68% of its dry weight with a latex (80% butadiene-20% methacrylic acid, 50 Mooney), dried, and heated 1 minute at 380° F. Delam. res.—64 oz., wet tensile—0.91 lbs./in., edge tear—1.7 lb./in.

Sample S

Same as R except the impregnant contained 98% of the polymer and 2% phenolic resin. Dried, then heated 1 minute at 380° F. Delam. res.—100 oz., wet tensile—16.6 lbs./in., edge tear—1.7 lbs./in.

Sample T

A 27-pound creped kraft paper was impregnated with 90% of its dry weight with a latex composed of 75% butadiene, 19% styrene, 8% ethacrylic acid. Dried, heated 1 minute at 380° F. Delam. res.—46 oz., wet tensile—2.21 lbs./in., edge tear—4.4 lbs./in.

Sample U

Same as T except the impregnant contained 95% of the polymer and 5% melamine-formaldehyde resin. Dried, heated 1 minute at 380° F. Delam. res.—51 oz., wet tensile—13.6 lbs./in., edge tear—2 lbs./in.

As indicated heretofore, the unified papers formed in accordance with this invention are particularly useful as backings of normally tacky tapes and particularly masking tapes. Any suitable normally tacky and pressure-sensitive adhesive useful in masking tapes may be used. Such adhesives are generally compounded from a composition of synthetic rubber or similar elastomeric polymer, and a resinous component compatible with the rubber and adapted to impart tack to the adhesive composition, together with suitable amounts of various types of additives such as conventional fillers, antioxidants, etc. The elastomeric component, tackifying resin, and fillers when used, are proportioned to obtain in the adhesive properties of high internal strength and cohesiveness and high adhesiveness.

Examples of specific adhesive compositions useful in forming the novel tapes in accordance with this invention are as follows:

TYPE A

| | |
| --- | --- |
| Milled pale crepe rubber | 100 |
| Polybetapinene resin | 75 |
| Petroleum oil | 5 |
| Polymerized trimethyldihydroquinoline | 2 |

TYPE B

| | |
| --- | --- |
| Milled smoked sheet rubber | 100 |
| Zinc oxide | 50 |
| Dehydrogenated rosin | 75 |
| Sym. di-beta-napthyl-paraphenylene diamine | 2 |
| Lanolin | 10 |

TYPE C

| | |
| --- | --- |
| Butadiene - styrene copolymer (butadiene - styrene ratio 70:30, Mooney value 50) | 50 |
| Smoked sheet | 50 |
| Ester of hydrogenated rosin | 50 |
| Polymerized trimethyldihydroquinoline | 2 |
| Petroleum oil | 20 |

TYPE D

| | |
| --- | --- |
| Polyvinyl ethyl ether resin (intrinsic viscosity=2.37) | 100 |
| Hydrogenated rosin | 5 |
| Phenylalpha naphthylamine | 0.35 |
| Polyethylene glycol 400 (di,tri) ricinoleate | 1.5 |

TYPE E

| | |
| --- | --- |
| Polyisobutylene high polymer, solid | 100 |
| Polyisobutylene polymer, viscous liquid | 70 |
| Toluene | 520 |

In forming the novel tapes of this invention, the adhesive may be applied to the unified paper of the invention in any conventional manner, as, for example, by calendering, reverse roll-coater, knife-coater, etc. The adhesive is generally coated at a dry coating weight of about 1 to 3 ounces per sq./yd. The adhesive is preferably applied to the unified paper from solvent solution or dispersion; using aliphatic or aromatic solvents and subsequent drying. If desired, the backing may be provided with a suitable conventional priming coating to improve the adhesion of the coating thereto. Suitable primer coatings are, for example, those disclosed in Bemmel's Patent No. 2,647,843.

Reference is now made to the accompanying drawing which shows in cross section a tape prepared in accordance with the present invention. The tape comprises a unified backing (1) formed in accordance with the teachings of this invention and having on one side a coat (2) of a normally tacky and pressure-sensitive adhesive.

The invention in its broader aspects is not limited to the specific steps, methods, compositions, combinations and improvements described but departures may be made

What is claimed is:

1. A paper-backed normally tacky and pressure-sensitive adhesive tape wound upon itself in roll form having improved characteristics of wet tensile strength and delamination resistance and good flexibility, elongation and edge tear, comprising a unified web internally bonded with a unifying composition in an amount from about 25 to about 200% of the non-unified web on a dry weight basis, said unifying composition comprising an elastomeric copolymer of a conjugated diene and at least one unlike copolymerizable monomer, one of said monomers containing a carboxylic group, and a cured aldehyde resin derived from a water-dispersible, heat-reactive resin selected from the group consisting of phenol-formaldehyde resins, urea-formaldehyde resins and melamine-formaldehyde resins, said cured aldehyde resin being in an amount from about 0.5 to about 25% of the unifying composition on a dry weight basis, and said unified web having at least one major surface coated with a normally tacky and pressure-sensitive adhesive.

2. A paper-backed normally tacky and pressure-sensitive adhesive tape according to claim 1 wherein the elastomeric copolymer is a butadiene-styrene-ethacrylic acid copolymer.

3. A paper-backed normally tacky and pressure-sensitive adhesive tape according to claim 1 wherein the elastomeric copolymer is a butadiene-methacrylic acid copolymer.

4. A paper-backed normally tacky and pressure-sensitive adhesive tape according to claim 1 wherein the cured aldehyde resin is derived from a heat-reactive phenol-formaldehyde resin.

5. A paper-backed normally tacky and pressure-sensitive adhesive tape according to claim 1 wherein the cured aldehyde resin is derived from a heat reactive urea-formaldehyde resin.

6. A paper-backed normally tacky and pressure-sensitive adhesive tape according to claim 1 wherein the cured aldehyde resin is derived from a heat-reactive malamine-formaldehyde resin.

7. A paper-backed normally tacky and pressure-sensitive adhesive tape according to claim 1 wherein the conjugated diene is butadiene.

8. A paper-backed normally tacky and pressure-sensitive adhesive tape according to claim 1 wherein the monomer containing the carboxylic group is selected from the group consisting of unsaturated aliphatic monocarboxylic acids and unsaturated aliphatic polycarboxylic acids, anhydrides and partial esters thereof.

9. A paper-backed normally tacky and pressure-sensitive adhesive tape according to claim 8 wherein the conjugated diene is butadiene.

10. A paper-backed normally tacky and pressure-sensitive adhesive tape wound upon itself in roll form having improved characteristics of delamination resistance and wet tensile strength and good flexibility, elongation and edge tear, comprising a unified web internally bonded with a unifying composition in an amount from about 25 to about 200% of the non-unified web on a dry weight basis, said unifying composition comprising an elastomeric copolymer of a conjugated diene and at least one unlike copolymerizable monomer, one of said monomers being an acrylic acid, and a cured aldehyde resin derived from water-dispersible, heat-reactive resin selected from the group consisting of phenol-formaldehyde resins, urea-formaldehyde resins, and melamine-formaldehyde resins, said cured aldehyde resin being in an amount from about 0.5 to about 25% of the unifying composition on a dry weight basis, and said unified web having at least one major surface coated with a normally tacky and pressure-sensitive adhesive.

11. A paper-backed normally tacky and pressure-sensitive adhesive tape according to claim 10 wherein the conjugated diene is butadiene.

12. A paper-backed normally tacky and pressure-sensitive adhesive tape according to claim 10 wherein the cured aldehyde resin is derived from a water-dispersible, heat-reactive phenol-formaldehyde resin.

13. A paper-backed normally tacky and pressure-sensitive adhesive tape according to claim 10 wherein the cured aldehyde resin is derived from a water-dispersible, heat-reactive melamine-formaldehyde resin.

14. A paper-backed normally tacky and pressure-sensitive adhesive tape according to claim 10 wherein the cured aldehyde resin is derived from a water-dispersible, heat-reactive urea-formaldehyde resin.

15. A paper-backed normally tacky and pressure-sensitive adhesive tape according to claim 10 wherein the acrylic acid is ethacrylic acid.

16. A paper-backed normally tacky and pressure-sensitive adhesive tape wound upon itself in roll form according to claim 10 wherein the acrylic acid is methacrylic acid.

17. A paper-backed normally tacky and pressure-sensitive adhesive tape wound upon itself in roll form having improved characteristics of delamination resistance and wet tensile strength and good flexibility, elongation and edge tear, comprising a unified web internally bonded with a unifying composition in an amount from about 25 to about 200% of the non-unified web on a dry weight basis, said unifying composition comprising an elastomeric copolymer of butadiene and at least one unlike copolymerizable monomer, one of said monomers being an ethacrylic acid, and a cured aldehyde resin derived from a water-dispersible, heat-reactive phenol-formaldehyde resin, said cured aldehyde resin being in an amount from about 0.5 to about 25% of the unifying composition on a dry weight basis, and said unified web having at least one major surface coated with a normally tacky and pressure-sensitive adhesive.

18. A paper-backed normally tacky and pressure-sensitive adhesive tape according to claim 17 wherein the elastomeric copolymer is a butadiene-styrene-ethacrylic acid copolymer.

19. A paper-backed normally tacky and pressure-sensitive adhesive tape wound upon itself in roll form having improved characteristics of delamination resistance and wet tensile strength and good flexibility, elongation and edge tear, comprising a unified web internally bonded with a unifying composition in an amount from about 25 to about 200% of the non-unified web on a dry weight basis, said unifying composition comprising an elastomeric copolymer of butadiene and at least one unlike copolymerizable monomer, one of said monomers being methacrylic acid, a cured aldehyde resin derived from a water-dispersible, heat-reactive melamine-formaldehyde resin, said cured aldehyde resin being in an amount from about 0.5 to about 25% of the unifying composition on a dry weight basis, and said unified web having at least one major surface coated with a normally tacky and pressure-sensitive adhesive.

20. A paper-backed normally tacky and pressure-sensitive adhesive tape wound upon itself in roll form having improved characteristics of delamination resistance and wet tensile strength and good flexibility, elongation and edge tear, comprising a unified web internally bonded with a unifying composition in an amount from about 25 to about 200% of the non-unified web on a dry weight basis, said unifying composition comprising an elastomeric copolymer of butadiene and at least one unlike copolymerizable monomer, one of said monomers being methacrylic acid, and a cured aldehyde resin derived from a water-dispersible, heat-reactive urea-formaldehyde resin, said cured aldehyde resin being in an amount from about 0.5 to about 25% of the unifying composition on a dry weight basis, and said unified web having at least one major surface coated with a normally tacky and pressure-sensitive adhesive.

21. The method of forming a paper-backed normally tacky and pressure-sensitive adhesive tape having improved characteristics of wet tensile strength and delamination resistance and good flexibility, elongation and edge tear which comprises impregnating a fibrous web with an aqueous dispersion of a unifying composition in an amount from about 25 to about 200% of the fibrous web on a dry weight basis, said unifying composition comprising an elastomeric copolymer of a conjugated diene and at least one unlike copolymerizable monomer, one of said monomers containing a carboxylic group, and a water-dispersible, heat-reactive aldehyde resin selected from the group consisting of phenol-formaldehyde resins, urea-formaldehyde resins and melamine-formaldehyde resins, said aldehyde resin being in an amount from about 0.5 to about 25% of the unifying composition on a dry weight basis, drying and curing said impregnated web, and applying to at least one major surface of said dried and cured web a coating of a normally tacky and pressure-sensitive adhesive.

22. A paper-backed normally tacky and pressure-sensitive adhesive tape wound upon itself in roll form having improved characteristics of wet tensile strength and delamination resistance and good flexibility, elongation and edge tear, comprising a unified web internally bonded with a unifying composition in an amount from about 25 to about 200% of the non-unified web on a dry weight basis, said unifying composition comprising an elastomeric copolymer of a conjugated diene and at least one unlike copolymerizable monomer, one of said monomers containing a carboxylic group, and a cured aldehyde resin derived from a water-dispersible, heat-reactive resin selected from the group consisting of phenol-formaldehyde resins, urea-formaldehyde resins and melamine-formaldehyde resins, said cured aldehyde resin being in an amount from about 0.5 to about 7.0% of the unifying composition on a dry weight basis, and said unified web having at least one major surface coated with a normally tacky and pressure-sensitive adhesive.

23. A paper-backed normally tacky and pressure-sensitive adhesive tape wound upon itself in roll form having improved characteristics of delamination resistance and wet tensile strength and good flexibility, elongation and edge tear, comprising a unified web internally bonded with a unifying composition in an amount from about 25 to about 200% of the non-unified web on a dry weight basis, said unifying composition comprising an elastomeric copolymer of butadiene and at least one unlike copolymerizable monomer, one of said monomers being methacrylic acid, and a cured aldehyde resin derived from a water-dispersible, heat-reactive phenol-formaldehyde resin, said cured aldehyde resin being in an amount from about 0.5 to about 25% of the unifying composition on a dry weight basis, and said unified web having at least one major surface coated with a normally tacky and pressure-sensitive adhesive.

References Cited in the file of this patent

UNITED STATES PATENTS

| | | |
|---|---|---|
| 2,553,816 | Ebel | May 22, 1951 |
| 2,607,709 | Simpson | Aug. 19, 1952 |
| 2,656,324 | Grotenhuis | Oct. 20, 1953 |
| 2,708,192 | Joesting | May 10, 1955 |
| 2,725,981 | Abere | Dec. 6, 1955 |

FOREIGN PATENTS

| | | |
|---|---|---|
| 165,444 | Australia | Sept. 30, 1955 |

OTHER REFERENCES

Searer: Phenolic Resins in Natural and Synthetic Rubber Age, November 1947, pages 191–193.

Ellis: Chemistry of Synthetic Resins, vol. II, Reinhold Publishing Corp., 330 W. 42nd Street, N. Y. C., page 1076.